United States Patent [19]

Finegan

[11] Patent Number: 5,208,801
[45] Date of Patent: May 4, 1993

[54] METHOD AND APPARATUS FOR CORRECTING FOCUS IN AN OPTICAL RECORDING SYSTEM

[75] Inventor: Joel D. Finegan, Campbell, Calif.

[73] Assignee: Tandy Corporation, Ft. Worth, Tex.

[21] Appl. No.: 753,017

[22] Filed: Aug. 23, 1991

Related U.S. Application Data

[63] Continuation of Ser. No. 513,406, Apr. 23, 1990, abandoned, which is a continuation-in-part of Ser. No. 294,723, Jan. 10, 1989, which is a continuation-in-part of Ser. No. 153,288, Feb. 5, 1988, abandoned.

[51] Int. Cl.$^5$ .............................................. G11B 7/08
[52] U.S. Cl. .................................. 369/284; 369/100; 369/44.23; 250/201.2; 250/201.5
[58] Field of Search ............ 369/284, 110, 112, 44.11, 369/44.14, 100, 121, 122, 126, 44.22, 44.23; 250/201.2, 201.5

[56] References Cited

U.S. PATENT DOCUMENTS

| | | | |
|---|---|---|---|
| 4,398,203 | 8/1983 | Cornet | 346/135.1 |
| 4,430,659 | 2/1984 | Maffitt et al. | 346/135.1 |
| 4,520,471 | 5/1985 | Carlin | 369/112 |
| 4,527,173 | 7/1985 | Gupta et al. | 346/135.1 |
| 4,578,788 | 3/1986 | Ahn et al. | 369/275 |
| 4,645,712 | 2/1987 | Ishigaki et al. | 428/433 |
| 4,651,172 | 3/1987 | Watanabe et al. | 346/135.1 |
| 4,667,316 | 5/1987 | Suda et al. | 369/44.14 |
| 4,673,626 | 6/1987 | Takeda et al. | 430/14 |
| 4,680,458 | 7/1987 | Drexler | 235/487 |
| 4,680,745 | 7/1987 | Ota et al. | 369/44.38 |
| 4,700,336 | 10/1987 | Yoshida et al. | 369/44.38 |
| 4,709,363 | 11/1987 | Dirks et al. | 369/275 |
| 4,710,452 | 12/1987 | Raychaudhuri | 430/495 |
| 4,719,615 | 1/1988 | Feyrer et al. | 369/284 |
| 4,730,293 | 3/1988 | Pierce et al. | 369/122 |
| 4,752,922 | 6/1988 | MacAnally et al. | 369/44.38 |
| 4,771,413 | 9/1988 | Nago | 369/110 |
| 4,773,059 | 9/1988 | Minemura et al. | 369/100 |
| 4,780,867 | 10/1988 | Lind et al. | 369/100 |
| 4,791,625 | 12/1988 | Nakamura | 369/112 |
| 4,798,785 | 1/1989 | Pan et al. | 430/475 |
| 4,823,334 | 4/1989 | Tanaka et al. | 369/112 |
| 4,825,430 | 4/1989 | Halter et al. | 369/275 |
| 4,841,514 | 6/1989 | Tsuboi et al. | 369/44.11 |
| 4,852,075 | 7/1989 | Feyrer et al. | 369/100 |
| 4,852,077 | 7/1989 | Clark et al. | 369/284 |
| 4,853,912 | 8/1989 | Akasaka et al. | 369/13 |
| 4,879,709 | 11/1989 | Clark | 369/284 |
| 4,888,755 | 12/1989 | Itoh | 369/112 |
| 4,896,314 | 1/1990 | Skiens et al. | 369/284 |
| 4,918,682 | 4/1990 | Finegan | 369/275 |

FOREIGN PATENT DOCUMENTS

| | | |
|---|---|---|
| 1229410 | 11/1987 | Canada . |
| 0136070 | 4/1985 | European Pat. Off. . |
| 0263641 | 4/1988 | European Pat. Off. . |
| 0338776 | 10/1989 | European Pat. Off. . |

OTHER PUBLICATIONS

Watkinson, *The Art of Digital Audio*, Chapter 13, pp. 440-486, Focal Press (1988).
Hartman et al., "Erasable Bilayer Dye-Polymer Optical Recording Medium".
Miyaoka, "Digital audio is compact and rugged," *IEEE Spectrum* (Mar. 1984) pp. 35-39.
Jenkins et al., "Fundamentals of Optics" (1976) pp. 176-184.
NRC Advertising Materials (unknown date), pp. m-13 to m-15.

Primary Examiner—Eugene R. LaRoche
Assistant Examiner—Tan Nguyen
Attorney, Agent, or Firm—Townsend and Townsend

[57] ABSTRACT

An optical recording system. The system is directed towards optical recording media which is responsive to at least two wavelengths of light such as an erase beam and a record beam. Light of a lower wavelength is produced by a divergent light source such as a diode and only partially collimated in a collimating lens. When the record and erase beams pass through a common objective for focusing on the recording media, the slightly divergent lower wavelength beam is focused at the same location as the fully collimated higher wavelength beam.

18 Claims, 3 Drawing Sheets

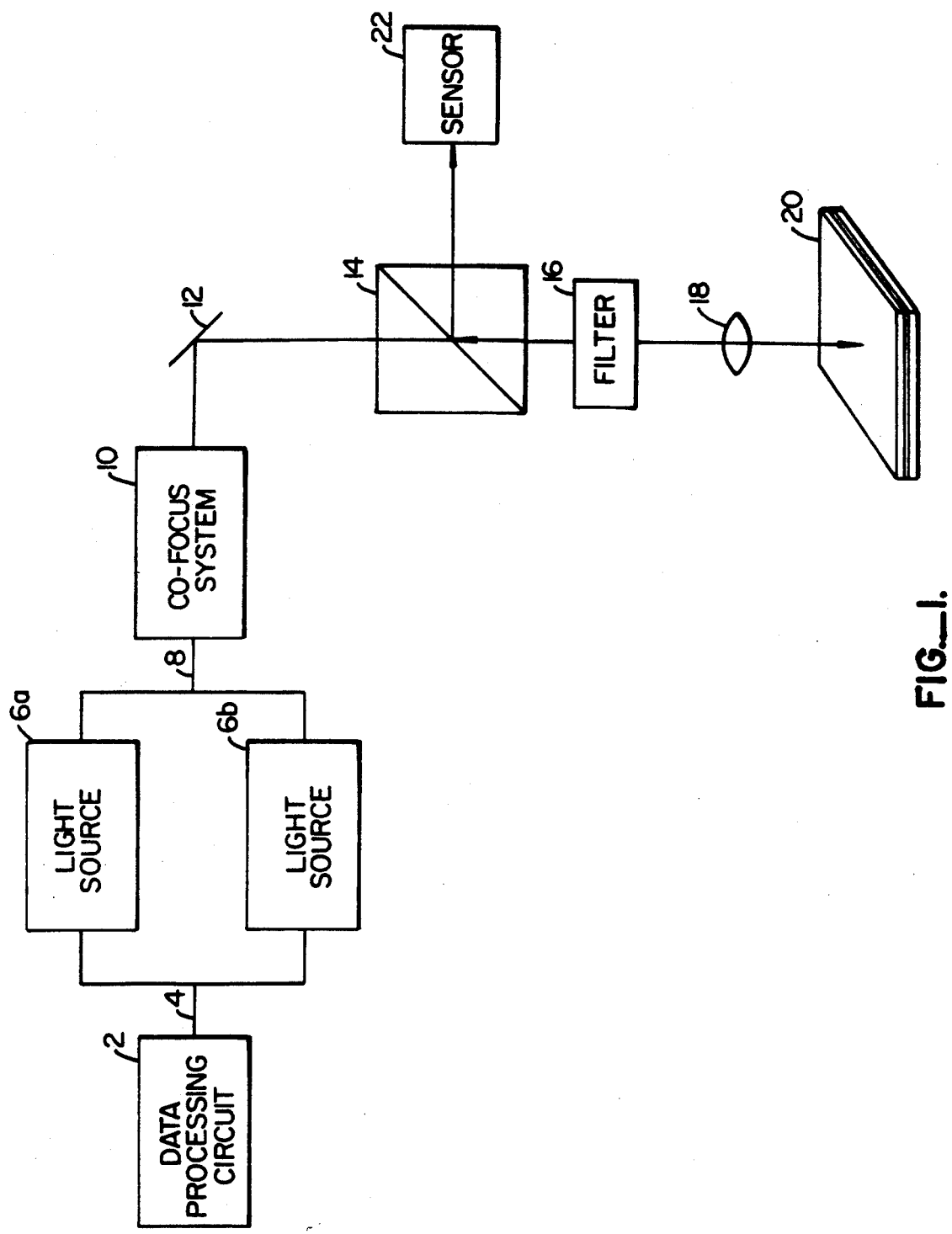
FIG._1.

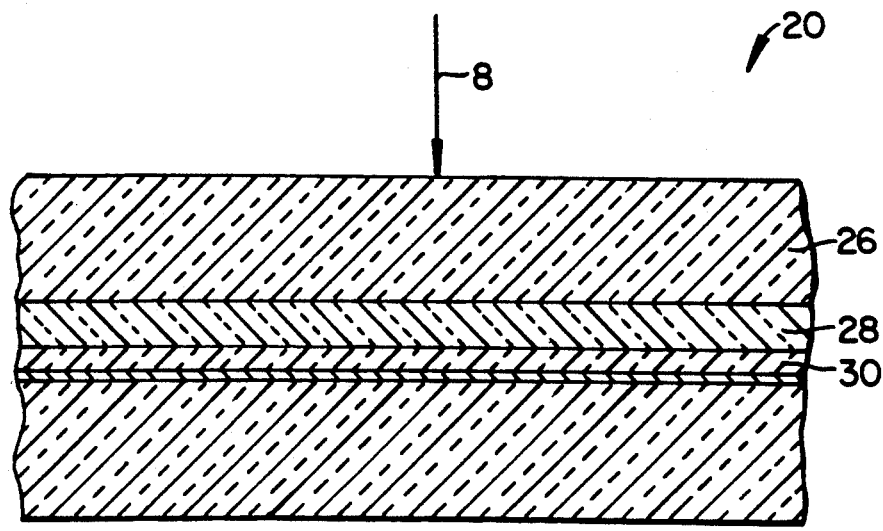
FIG._2.
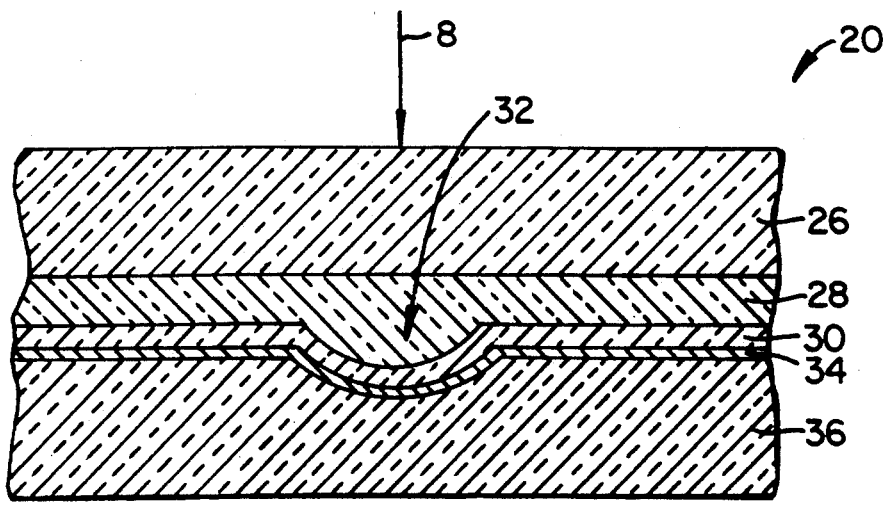
FIG._3.

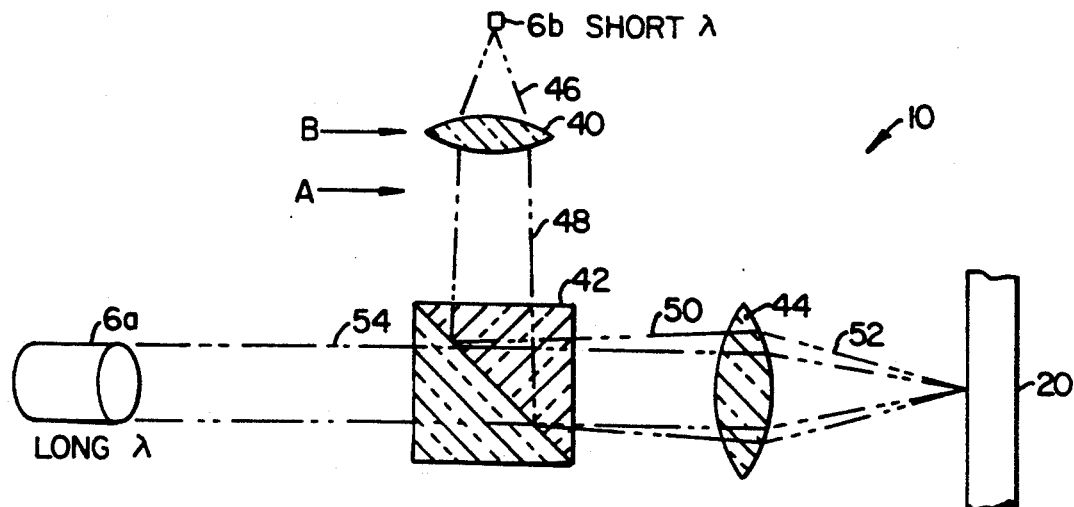
FIG._4.
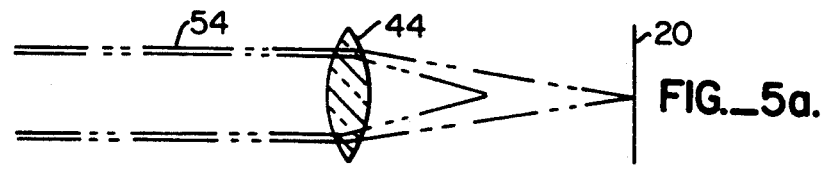
FIG._5a.
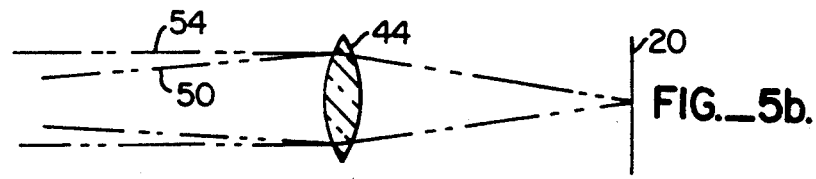
FIG._5b.
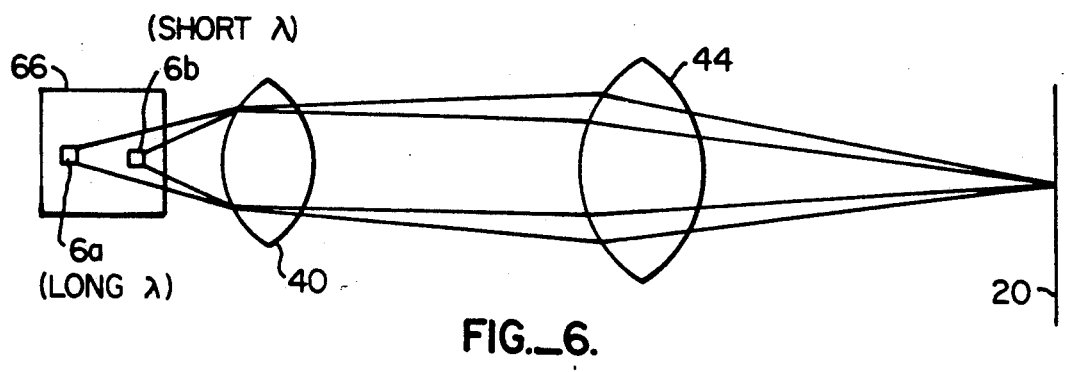
FIG._6.

METHOD AND APPARATUS FOR CORRECTING FOCUS IN AN OPTICAL RECORDING SYSTEM

REFERENCE TO RELATED APPLICATIONS

This is a continuation of application Ser. No. 513,406, filed Apr. 23, 1990, now abandoned, which application is a continuation-in-part of application Ser. No. 294,723, filed Jan. 10, 1989, which is a continuation-in-part of application Ser. No. 153,288, filed Feb. 5, 1988, now abandoned, both of which are incorporated herein by reference for all purposes.

BACKGROUND OF THE INVENTION

The present invention relates to the field of optical storage disks and recording systems. More specifically, in one embodiment the invention provides a method and apparatus for correcting the focus of, for example, erase and record beams in an erasable optical disk recording system.

Optical data storage media in the form of compact disks are well known as an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long-playing records. The process, referred to herein as the "mastering" process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now known as the glass master, then undergoes nickel electrocasting, a process which is similar to that used in making analog phono records. A series of metal replications follow, resulting in a disk called a stamper. The stamper is equivalent to a photographic negative in the sense that it is a reverse of the final compact disk; that is, there are now bumps where there should be pits. This stamper is then used to make a pressing on a transparent polymer such as polyvinyl chloride, poly(ethyl-metacrylate) and polycarbonate. The stamped surface is then plated with a reflective film such as aluminum or other metal and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players.

Media on which data can be recorded directly and read directly from have a different configuration and operate under a somewhat different principle. One example is described in U.S. Pat. No. 4,719,615 (Feyrer et al.) which is incorporated herein by reference for all purposes. The medium disclosed in Feyrer et al., includes a lower expansion layer of a rubbery material which expands when heated. The expansion layer is coupled to an upper retention layer which is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump. Reading or playback of the data is then achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer and not the expansion layer. This beam heats the retention layer alone to a rubbery state where its viscoelastic forces and those of the expansion layer return it to its original flat configuration. The write, read and erase beams all enter the medium on the retention layer side, passing through retention layer before reaching the expansion layer.

Improved recording media and methods of recording thereon are disclosed in copending U.S. application Ser. No. 294,723, which is incorporated herein by reference for all purposes.

In many erasable optical disk systems, it is necessary to utilize read, write, and/or erase beams which utilize different wavelengths of light. For example, in some embodiments of erasable optical recording media an 840 nm light beam is utilized for erasing data bumps from the media while a 680 nm light beam is utilized for recording data bumps on the media. In many embodiments it is also desirable to have these beams in focus at the same location on the recording media and, in some cases, it is desirable to have such beams in focus at the same location at the same time. This can often be a difficult problem because the refractive index of many optical materials such as those used in lens systems is a function of the wavelength of light and, therefore, a system which focuses one of the beams fails to focus the other. If one or both of the beams are not focused on the recording media a variety of problems will arise. For example, if the write beam is not properly focused, the data mark formed on the recording media may spread over a larger than desired area or may have insufficient power to record an appropriate mark. Conversely, if .-the erase beam is not properly focused, multiple marks may be erased or the erase beam may fail to erase desired marks.

From the above it is seen that an improved method and apparatus for recording on an optical storage media is desired.

SUMMARY OF THE INVENTION

A method and apparatus of focusing beams of different wavelengths on an optical storage media is disclosed. The apparatus provides for the use of inexpensive, readily available components and provides for focusing of beams of different wavelengths at the same or nearly the same location on the optical storage media.

In one embodiment the invention provides for the use of a doublet lens to focus beams of light having different wavelengths at a common location on a substrate. In another embodiment the invention provides for the use of a collimating lens in conjunction with a laser diode light source. The collimating lens is placed closer to the diode than would be desired for exact collimation, resulting in a light beam from the diode which is slightly divergent when it enters a focus objective. Therefore, this slightly divergent beam focuses at a location different than that which could be expected from a fully collimated beam. Consequently, the cost of a doublet lens or other expensive or complex solution to chromatic aberration problems is avoided.

Accordingly, in one embodiment the invention provides a recording system for recording detectable marks on a storage media. The storage media is responsive to light of at least a first or a second wavelength, and the system includes a first light source for the first wavelength of light; a second light source for the second wavelength of light; an objective lens for focusing light from the first and the second light source on the recording media; and co-focusing means for adjusting a focus position of light from at least the first light source on the recording media, the co-focusing means moving the focus point of the light from the first light source towards a focus position of light from the second light source.

The co-focusing means in one embodiment is a doublet lens. In another embodiment the first wavelength of light is shorter than the second wavelength of light and the first light source is a divergent light source. The co-focusing means includes a collimating lens, the collimating lens displaced towards the first light source from a position at which it would produce a fully collimated light beam. In alternative embodiments the co-focusing means includes a collimating lens displaced away from the second light source from a position at which it would produce a fully collimated beam. In still further embodiments, both light sources are collimated by the same collimation lens, and the first light source is placed in a position displaced from the second light source so as to make the shorter wavelength beam slightly diverging or the longer wavelength beam slightly converging.

A method of focusing light beams from a first divergent light source and a second light source on an optical storage media with an objective lens is also disclosed. The first light source produces a lower wavelength of light than the second light source and the method includes the step of partially collimating light from the first light source and/or over collimating the second light source such that light rays from the first light source enter the objective lens as diverging light rays or light rays from the second light source enter the objective lens as converging rays.

A further understanding of the nature and advantages of the inventions herein may be realized by reference to the remaining portions of the specification and the attached drawings.

BRIEF DESCRIPTION OF THE DRAWINGS

FIG. 1 is an overall block diagram of a recording and erasing system for an optical storage media which may be used according to one embodiment of the invention;

FIG. 2 is a cross-section of an optical recording media without a data bump;

FIG. 3 is a cross-section of an optical recording media with a recorded data bump;

FIG. 4 is a block diagram of one embodiment of a focus correction device according to one embodiment of the invention;

FIGS. 5a and 5b graphically illustrate the impact of the invention; and

FIG. 6 illustrates an alternative embodiment of the invention.

DESCRIPTION OF THE PREFERRED EMBODIMENTS

Contents

I. General
II. Details of One Embodiment of a Recording Media
III. Details of the Co-Focusing System
  A. General
  B. Details of a Second Embodiment
  C. Details of a Third Embodiment
  D. Example

I. General

FIG. 1 is an overall block diagram illustrating an electro-optical system for recording data on a data storage medium in accordance with one aspect of the present invention. The recording system includes a digital data processing circuit 2 whose output on line 4 controls read, write, and/or erase light sources 6a and 6b which produce light of 2 or more wavelengths. The laser beams 8 emerging from the light sources 6a and 6b are co-focused and optionally colliminated in co-focus system 10 and then reflected by an optional mirror 12. The reflected beam from the mirror is propagated through a beam splitter 14.

The beam(s) emerging from the beam splitter 14 is passed through a filter 16, which may be a quarter-wavelength plate, and then propagated through an objective lens 18 which focuses the laser beams on a moving optical data storage medium 20. Light reflected back from the medium 20 is collected by the lens 18 and propagated through the filter 16 to the beam splitter 14, which propagates the reflected light to a light sensor 22 for purposes of reading data from the disk.

Light source 6a may be, for example, a high power diode (2-15 milliwatts at the media surface) and is either continuous, shaped, or pulsed. The wavelength of the beam produced by the laser 6a is the wavelength referred to herein as the "record" wavelength. The wavelength of the beam produced by the light source 6b is referred to herein as the erase wavelength.

The effect which the system produces on an optical data storage medium 20 is seen in FIGS. 2 and 3. The write beam 8 enters the medium 20 at a transparent substrate 26, and passes through the transparent substrate into an expansion layer 28. The expansion layer, which is absorptive of light at the write or record wavelength, rises in temperature due to the absorption, but is kept from localized expansion by the rigid substrate 26. Expansion pressure thus builds up and a retention layer 30 begins to deform. Meanwhile, the temperature of the retention layer 30 rises by conduction from the expansion layer, and possibly by light absorption of the write beam laser as well. As the temperature of the retention layer increases, it approaches its glass transition temperature and a small weak area is formed around the axis of the incident beam. The expansion layer then flows into the weak areas allowing expansion to be localized and thereby creating a well defined bulge 32. The retention layer 30 and a reflection layer 34 deform accordingly to follow the contour of the bulge, and protrude into a compliant, protective layer 36. When the write laser is turned off, the various layers cool. The layer 36 acts as a heat sink rapidly drawing heat away from the retention layer 30 through the reflective layer 34, and the retention layer 30 cools down below its glass transition temperature, increasing its shear modulus to "lock in" the deformation while the expansion layer 28 is still in its expanded state.

Reading from the media is achieved by using, for example, the write beam operated at a lower power level. Light reflected from the media at this lower power level are detected and processed by sensor 22.

Erasure is achieved by using light source 6b of a different wavelength, one which is absorbed primarily by the retention layer 30. The expansion layer 28 may also be absorptive at this wavelength to some degree provided that the resulting temperature increase in the expansion layer is not great enough to record a mark. Absorption of the light from this beam by the retention layer will raise it to its rubbery state, at which point the elastic forces in the expansion layer as well as the viscoelastic properties in the retention layer will draw the retention layer (as well as the reflective layer 34) back to the configuration shown in FIG. 2.

II. Details of One Embodiment of a Recording Media

The expansion layer 28 of the recording media is formed of a material or combinations of materials which display some light absorption at the wavelength of the record beam. The wavelength of this beam of light may be chosen from a wide spectrum of available light wavelengths. The degree of absorptivity may vary from wavelength to wavelength and from expansion material to expansion material. For example, however, this degree of absorptivity could be between 20% and 40% in the wavelength range from 850 nm to 650 nm. To maintain the ability to read data recorded on this unique optical media on standard detection mechanisms, such as those found on conventional compact disk players, a maximum double-pass absorption at the compact disk read wavelength (780 nm) of 10% is preferred.

The expansion layer has a high coefficient of thermal expansion, particularly when compared to the other layers of the medium. Coefficients above about $1 \times 10^{-4}/°$ C. are preferred, with those greater than about $5 \times 10^{-4}/°$ C. particularly preferred, and those greater than about $7.5 \times 10^{-4}/°$ C. most preferred.

In addition, the expansion layer material is rubbery at ambient temperature, i.e., having a high coefficient of elasticity, to the extent that it will expand readily during recordation without exceeding its upper expansive limit. When at room temperature, the expansion layer material is near or above its glass transition temperature, which is preferably below 30° C.

The retention layer 30 is formed of material or combinations of materials which display at least some light absorption at the wavelength of the erase beam. The wavelength of the erase beam light may be chosen from a wide spectrum of available light wavelengths. The degree of absorptivity may vary from wavelength to wavelength and from retention material to retention material but may be for example about 30% to 45% at wavelengths between 650 nm and 860 nm. To facilitate the ability to accurately erase data recorded on the optical media it is desirable to be able to read data through the retention layer. Therefore it is preferable to limit the maximum double-pass absorption of the retention layer at the erase wavelength to less than 80% even though the system can be made to work with more absorption.

The retention layer material has a glass transition temperature which is above ambient temperature and very much above the glass transition temperature exhibited by the expansion layer. In general, this glass transition temperature will range from about 50° C. to 300° C., preferably it will lie between 75° C. to 125° C. When above the glass transition temperature, the material is rubbery with a sufficient elasticity to permit it to deform to the contour of the distortion formed in the reflective layer caused by the expansion of the expansion layer without exceeding its elasticity limit.

In further embodiments of the invention, the retention layer has a high thermal conductivity, causing it to rapidly rise in temperature above its glass transition temperature when light energy from the erase beam is applied. After the erase beam has been turned off, this high thermal conductivity serves to foster the rapid cooling of the retention layer to its glassy state. Since, at this time, light energy is still being applied to the expansion layer by the record beam, the expansion layer is still in its enlarged condition and the reflection layer is still locally deformed by the expanded expansion layer. The cooled retention layer can now hold, because of tight bonding between the reflection and expansion layers, the deformed reflective and expansion layers in their extended positions after the write beam is no longer exciting the expansion layer and the expansion layer has cooled. A retention layer having a thermal conductivity of at least about $2.5 \times 10^{-4}$ cal/(sec cm² (° C./cm)) will provide adequate results.

The reflective layer 34 serves to reflect light (e.g., more than 25% of the light striking it) back through the expansion and retention layers for the purposes of improved data recordation and data detection. During the recordation process the reflective properties of the reflective layer causes the recording light beam to double-pass through the expansion layer, thus doubling the effective light beam path inside the expansion layer. Energy for the purposes of heating and thus expanding the expansion layer is thereby absorbed for both directions of the recordation light beam.

So that recorded data is able to be read by standard compact disk player reading mechanisms, the reflective layer provides the means for reflecting light energy incident on the media's substrate back through the media's substrate, after this light energy has been modulated by recorded data. Since the reflective layer is deformable it conforms to the shape of the deformations in the expansion layer, which represent the recorded data. Therefore, an incident read light beam is effectively modulated by quarter wavelength interference as well as light scattering.

Certain embodiments of the present invention also include a protective layer 36 placed over the reflective layer to protect it from damage due to contact with external objects. Characteristics of the protective layer are:

(A) Low absorption of light energy at all wavelengths, but particularly at the erase wavelength.
(B) Sufficiently compliant to allow the deformations in the reflective layer to easily protrude into it and thereby offer little resistance to their formation.
(C) Sufficient thickness such that the bumps formed in the reflective layer are not transmitted into a protective layer and then subsequently through the protective layer to the outer surface.
(D) High thermal conductivity to enable it to serve as a heat sink for purposes of rapid cooling of the retention layer, immediately after the erase beam impinging on its surface is turned off. A thermal conductivity of at least $5 \times 10^{-4}$ cal/(sec cm$^2$ (° C./cm)) will provide adequate results. The protective layer is preferably $2 \times 10^{-3}$ cal/(sec cm$^2$ (° C./cm)).

The various layers described above are arranged on a substrate with the expansion layer which may be directly bonded to the overlaying substrate, the retention layer bonded to and directly overlaying the expansion layer, the reflective layer bonded to and directly overlaying the retention layer, and the optional protective layer bonded to and directly overlaying the reflective layer. The substrate itself is formed of a rigid transparent material which permits substantially full transmission of light at all wavelengths. The substrate is sufficiently thick and rigid to provide structural integrity to the medium and does not deform in response to pressure caused by expansive forces in the expansion layer. Bulges in the expansion layer, caused by its thermal expansion upon absorption of the record beam's light energy, protrude away from the substrate due to the substrate's rigidity. With this layer arrangement, the bulges protrude into the reflective and retention layers, causing their deformation as described above.

The thickness of the layers will be selected in accordance with the optics of the system. For example, in order to maintain the minimum mark size during data recordation with the greatest write sensitivity during recording, the laser beam should be maintained as small as possible as it passes through the expansion layer. Accordingly, most of the expansion layer should be within the focal depth of the record beam. For recording systems having optical parameters similar to those found in standard compact disk players, the record beam is diffraction limited and has a focal depth of approximately 1.0 to 2.0 microns. In such cases, best results can be obtained with an expansion layer preferably 1.0 microns or less.

In a similar manner, to maintain the minimum erasure area during the course of data erasure, the laser beam should be maintained as small as possible as it passes through the retention layer. Accordingly, most of the retention layer should be within the focal depth of the erase beam. For erasure systems having optical parameters similar to those found in standard compact disk players, the erase beam is also diffraction limited and has a focal depth of approximately 1.0 to 2.0 microns. In such cases, best results can be obtained with a retention layer having a thickness similar to that of the expansion layer or approximately 0.5 to 1.5 microns, preferably 1.0 microns or less.

The substrate and the optional protective layers are considerably thicker, the substrate layer being on the order of 1 millimeter or more and the optional protective layer being on the order of tens of microns or more, in view of their respective functions (i.e., the substrate must be thick enough to impart rigidity to the medium and the protective layer must be thick enough to protect the data protrusions from external abuse). The substrate is preferably 1.2 mm. The protective layer is preferably about 2 $\mu$ thick.

The materials used in forming the layers will be selected on the basis of the properties indicated above, i.e., transparency, reflectivity, absorptivity, glass transition temperature, elasticity and thermal expansivity. The preferred materials for all layers except the reflective layer are amorphous polymers. Examples of such materials are rubbers, natural rubbers such as butyl rubbers, silicone rubbers, natural rubbers and styrene-butadiene rubbers; polymers such as cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose and polyvinyl alcohol; and substances such as gelatine glue, casein, egg albumin and dihydroabietyl alcohol. Materials with high elasticity such as elastomers and polymers with elongations greater than 15% are preferred for construction of the expansion layer. Materials with relatively high glass transition temperatures, notably greater than 50° C., with elongations greater than 5%, such as those found in the epoxy family of resins, are preferred for construction of the retention layer.

The reflective layer may be formed of any reflective material which is sufficiently elastic and malleable to conform to the bulges protruding from the expansion layer. The material should not unduly constrict bump formation and should not become substantially work hardened over the number of desired write and erase cycles. Examples of such materials are gallium, aluminum, copper, silver, gold and indium. Other examples are alloys, particularly eutectic alloys of bismuth with tin or cadmium.

The absorptive characteristics of the various layers may be imparted thereto using methods that will be apparent from the above disclosure and known to those of skill in the art. Since the media of the present invention need not be wavelength specific, a broad range of dyes or pigments are available for this purpose. In addition, except for the ability to pass a portion of the wavelength energy which is employed for the purpose of reading the recorded data, these dyes or pigments need not be wavelength specific and may therefore absorb light energy over a broad spectrum of wavelengths. Since standard compact disk player detection mechanisms require a minimum of 70% reflection, as seen by light which is incident on the substrate side of the media, and employ laser diodes which function at 780 nm wavelength for the purpose of reading data, it is preferable to limit the maximum double-pass absorption of the expansion and retention layer at this wavelength to less than 10% even though the system can be made to work with more absorption. Dyes or pigments which may be used singly or in combination are nigrosin blue, aniline blue, Calco Oil Blue, ultramarine blue, methylene blue chloride, Monastral Blue, Malachite Green Ozalate, Sudan Black BM, Tricon blue, Macrolex green G, DDCI-4 and IR26.

The various layers of the media of the present invention are bonded together according to conventional techniques. It is preferred that adjacent layers be optically coupled to one another such that substantially all light propagated through one layer enters, or is reflected off, the adjacent layer.

The media of the present invention may be fabricated in accordance with conventional techniques, whereby the various layers are applied in succession by coating over a substrate. Knife spread techniques, spin coating techniques, and metal vapor deposition are examples of techniques which may be used.

III. Details of the Co-Focusing System

A. General

The co-focus system described herein focuses both the write and erase beams by way of a single optical system. In one embodiment the co-focus system 10 shown in FIG. 1 is a wavelength corrected lens (otherwise known as a doublet lens) which ensures that light of both record and erase beams focus at or near the same location on the recording media. It will be recognized by those of skill in the art that it is in fact desirable to focus the erase beam in the retention layer and the write beam on the expansion layer. These layers are extremely thin, however, and the error induced by chromatic effects is far greater than the thickness of these layers. For purposes of the discussion herein, the location of these layers is taken to be approximately the same. Doublet lenses are described in, for example, Jenkins et al., "Fundamentals of Optics," pgs. 176-184 (1976) which is incorporated herein by reference for all purposes. Such doublet lenses tend to be relatively expensive due to the high cost of precision manufacture of such lens systems.

In a second embodiment, the co-focus system uses a single objective lens 44 in the record/play assembly The two beams are focused at the same location and compensation for the differing wavelengths of the erase and record beams is achieved by slightly prediverging the shorter wavelength beam before it enters the objective lens. In alternative embodiments, the longer wavelength beam is slightly converging before it enters the objective lens.

B. Details of a Second Embodiment

As shown in FIG. 4 the co-focus system 10 is used to focus an erase beam, write beam, or read beam of different wavelengths at the same location. In FIG. 4 the filter 16, mirror 12 and the like have been omitted for the sake of clarity. In the embodiment shown in FIG. 4 the erase beam is a longer wavelength beam such as an 840 nm colliminated beam from a laser light source 6a such as a model no. LN9840K manufactured by Matsushita. The write/read beam is, for example, a 680 nm laser diode beam from a light source 6b such as a model no. 98-016 manufactured by NEC. It will be recognized by those of skill in the art that the erase beam could be the shorter wavelength beam without departing from the scope of the invention herein.

Light from the diode 6b will be highly divergent and, therefore, a collimating lens 40 is provided adjacent the laser diode. However, in order to focus light at the same location as the erase beam while using a single objective lens, the collimating lens is placed slightly closer to the laser diode than would be required for exact collimation. For example, if the beam emerging from the collimating lens could be fully collimated (i.e., parallel) if the collimating lens was centered at position "A", the lens is instead centered at position "B". Preferably, the lens 40 is placed on a moveable mount so as to facilitate adjustment of the lens. In the particular example used herein, the collimating lens is placed between about 1 and 1000 μm, preferably between about 100 and 300 μm, and most preferably about 200 μm closer to the laser diode than is required for exact collimation or about 6.8 mm from the laser diode 6b in one embodiment. Collimating lens 40 may be, for example, a model no. AV7140 made by Olympus.

Light from the 840 nm laser 6a is fully collimated as it emerges from the laser. Both beams are passed through a beam splitter 42, such as a model no. 03PBS052 manufactured by Melles Griot, and are therby directed to a single objective lens 44 and, thereafter, the recording media 20. Objective lens 44 may be, for example, a model no. AV4350-3 manufactured by Olympus.

In operation, the light beam 46 from the diode source 6b is grossly divergent. The light beam 48 from the collimating lens 40 is almost collimated, but differs from a fully collimated beam by between about 0.001 and 0.1 radians and preferably by about 0.015 radians at the point where the full width of the beam is at about half of the maximum intensity (i.e., full width/half max). The 680 nm light 50 emerging from the beam splitter is, therefore, also slightly divergent. Consequently, the 680 nm light 52 emerging from the objective lens focuses slightly behind the position at which it would have focused had the 680 nm light been fully collimated. In preferred embodiments, the light will focus about 0.05 mm to 0.10 mm ahead of the position it would have focused had the light from the diode been fully collimated. Conversely, the fully collimated 840 nm light 54 passes directly through the beam splitter 42 and is focused at its normal position. Hence, both the erase beam and the record beam are focused at substantially the same location without the need for an expensive doublet lens.

FIGS. 5a and 5b graphically illustrate the impact of the present invention. In FIG. 5a the shorter wavelength beam enters the objective lens fully collimated and focuses at a position well in advance of the recording media 20 while the longer wavelength beam 54 focuses at the recording media. Conversely, as shown in FIG. 5b, when the shorter wavelength beam 50 enters the objective lens 44 in a slightly diverging mode, both the longer and the shorter wavelength beams focus at the same location on the recording media. This will provide for better defined marks on the recording media, the need for lower power light sources, and the like.

C. Details of a Third Embodiment

FIG. 6 illustrates a third embodiment of the co-focus system 10. According to this embodiment, first and second divergent light sources 6a and 6b are both mounted in a common head 60. The light source 6a is a longer wavelength source used, for example, for erasing and the light source 6b is a shorter wavelength source used, for example, for writing on the media 20. According to the embodiment shown in FIG. 6, both light sources are collimated by the same lens or set of lenses 40 and are focused by the same lens or set of objective lenses 44. In order to provide for the focus of both the longer and the shorter wavelength source at the same location on the substrate, the longer wavelength source 6a is placed in a position which will provide complete collimation of the beam from the source 6a. Conversely, the short wavelength source 6b is placed closer to the collimation lens 40 than is required for complete collimation. Accordingly, the short wavelength beam from the collimation lens 40 is slightly diverging, as in the first embodiment. The longer wavelength beam, however, is fully collimated, also like the first embodiment. Of course it will be appreciated that, like the first embodiment, the short wavelength beam could be collimated while the long wavelength beam could be made slightly convergent to achieve the same result.

D. Example

An example of the design considerations used in a co-focus system is provided below.

The lens formula can be found in textbooks:

$$\frac{1}{f} = (n-1)\left(\frac{1}{r_1} - \frac{1}{r_2}\right) + \frac{(n-1)^2}{n} \frac{t_c}{r_1 r_2}$$

where:
f is the focal length of the lens;
n is the index of refraction of the lens glass; and
$r_1$, $r_2$, and $t_c$ are radii of curvature of the two surfaces of the lens and the thickness at the center, respectively.

Because the term on the right will generally be the much smaller of the two and to a degree the change in the numerator and the denominator of $(n-1)/n$ with change in n compensate each other, it is approximately true to say $$\frac{1}{f} = (n-1) \times K$$

where K is a constant of proportionality.

If $f_o$ is the focal length at a specified wavelength (e.g., 840 nm) and n is the refractive index for $f_o$, at a second wavelength the new index will be $n+\Delta$ and the focal length at this new wavelength will be $$\frac{1}{f} = (n + \Delta - 1)K = \frac{1}{f_o} + \Delta K = \frac{1}{f_o} + \frac{\Delta}{f_o(n-1)},$$

so:

$$\frac{1}{f} - \frac{1}{f_o} = \frac{\Delta}{f_o(n-1)}.$$

Values that might be encountered are:

$f_o = 4.3$ mm; $n = 1.6$; $\Delta = .01$ for 680 nm vs. 840 nm
$f - f_o = .071$ mm From the above it is seen that the light in the 680 nm beam will focus 0.071 mm in front of the 840 nm beam unless corrective measures are taken.

If the 680 light is brought to the objective lens in a slightly divergent beam then the 680 beam can be made to focus with the 840 beam. The lens condition is in general:

$$\frac{1}{f} = \frac{1}{O} + \frac{1}{I}$$

where:
O is the distance from the lens that the light appears to originate and I is the distance from the lens to the image plane. For proper operation, $I = f_o$ $$\frac{1}{f} = \frac{1}{O} + \frac{1}{f_o}$$

$$O = \frac{1}{\frac{1}{f} - \frac{1}{f_o}} = \frac{f_o(n-1)}{\Delta} \text{ from above.}$$

The position of the light source relative to the collimating lens can be adjusted to make this happen. A practical value of O is:

$$O = \frac{4.3(1.6 - 1)}{.01} = 258 \text{ mm.}$$

The light emerging from the collimating lens must "appear" to be coming from a point at a distance O from the objective lens. The collimator must produce a virtual image spaced a distance from the collimator of O less the distance d between the collimator and the objective. The collimator lens equation is:

$$\frac{1}{F} = \frac{1}{O_c} + \frac{1}{I}$$

or:

$$O_c = \frac{1}{\frac{1}{F} - \frac{1}{I}}$$

where:
F is the focal length of the collimator
$O_c$ is the location of the light source from the lens; and
I is the location of the image.
Therefore:

$$I = -(O - d) = -\left(\frac{F_o(n-1)}{\Delta} - d\right)$$

(negative signs on each side occur because the image is virtual)

$$O_c = \cfrac{1}{\cfrac{1}{F} + \cfrac{1}{\cfrac{f_o(n-1)}{\Delta} - d}}$$

The distance between this point and the focal point of the collimation lens is:

$$O_c - F = \cfrac{1}{\cfrac{1}{F} + \cfrac{1}{\cfrac{f_o(n-1)}{\Delta} - d}} - F.$$

For a practical case:

$F = 7$ mm $d = 30$ mm $f = 4.3$ mm $n = 1.6$ $\Delta = 0.01$

Therefore:

$O_c - F = -0.208$ mm or 208 $\mu$m.

It is to be understood that the above description is intended to be illustrative and not restrictive. Many variations of the invention will become apparent to those of skill in the art upon review of this disclosure. Merely by way of example the invention is illustrated primarily by way of record and erase beams of different wavelengths in association with an optical media, but the invention is not so limited. For example, the invention could find use in write-once/read-many media in which the record and read beams are of different wavelengths. Further, while the invention has been illustrated primarily with regard to one light source which is collimated, the collimated light source may actually include, for example, a divergent light source and a properly positioned collimating lens. The scope of the invention should, therefore, be determined not with reference to the above description, but instead should be determined with reference to the appended claims along with their full scope of equivalents.

What is claimed is:

1. A recording system for recording detectable marks on a storage media, said storage media responsive to light of at least a first wavelength, comprising:
   a) a first light source for generating said first wavelength of light;
   b) a second light source for generating a second wavelength of light, which is different from said first wavelength of light;
   c) an objective lens for focusing light from said first and said second light source; and
   d) a collimating lens for adjusting a focus position of light from at least one of said light sources on said recording media, said collimating lens being displaced from a first position said first position producing a fully collimated light beam from said at least one of said light sources, said light from said first and second light sources being simultaneously focused on same position of said recording media.

2. Apparatus as recited in claim 1 wherein:
   (a) said first wavelength of light is shorter than said second wavelength of light;
   (b) said first light source is a divergent light source; and
   (c) said collimating lens is displaced towards said first light source from said first position producing a fully collimated light beam.

3. Apparatus as recited in claim 2 wherein said first light source is a diode.

4. Apparatus as recited in claim 3 wherein said second light source is a collimated laser.

5. Apparatus as recited in claim 2 wherein said collimating lens is displaced from said first position producing a fully collimated light beam by more than about 100 $\mu$m.

6. Apparatus as recited in claim 2 wherein said collimating lens is displaced form said position producing a fully collimated light beam by about 200 $\mu$m.

7. Apparatus as recited in claim 1 wherein:
   (a) said first wavelength of light is shorter than said second wavelength of light;
   (b) said second light source is a divergent light source; and
   (c) said collimating lens is displaced away from said second light source from a position producing a fully collimated light beam.

8. Apparatus as recited in claim 1 wherein:
   (a) said first wavelength of light is shorter than said second wavelength of light;
   (b) said first and said second wavelengths of light are divergent light sources mounted in a common housing; and
   (c) said first light source is placed closer to said collimating lens than said second light source.

9. Apparatus as recited in claims 1, 2, 7, or 8 wherein said first wavelength is less than about 700 nm and said second wavelength is greater than about 800 nm.

10. Apparatus as recited in claims 1, 2, 7, or 8 wherein said first light source is a 680 nm light source and said second light source is a 840 nm light source.

11. Apparatus as recited in claims 1 or 2 further comprising a beam splitter for directing light from said first and said second light source to said objective lens.

12. A method of focusing light beams from a first divergent light source and a second light source on an optical storage media with an objective lens, said first light source producing a shorter wavelength of light than said second light source, comprising the step of partially collimating light from said first light source such that light rays from said first light source enter said objective lens as diverging light rays, said light from both light sources simultaneously focusing at the same position on said optical storage media.

13. The method as recited in claim 12 wherein said step of partially collimating light from said first light source is a step of collimating said light to between about 0.001 and 0.1 radians as defined in a plot of intensity as a function of direction, by the angle between a pair of points lying on opposite sides of the direction of maximum intensity and at which the intensity falls to ½ of a maximum value.

14. The method as recited in claim 13 wherein said light is collimated to about 0.015 radians.

15. The method as recited in claim 12 wherein said first light source is focused at a position about 0.05 to 0.10 mm from a position it would focus if fully collimated.

16. A method of focusing light from a first divergent light source and a second light source on an optical storage media with an objective lens, said first light source producing a longer wavelength than said second light source, comprising the step of over collimating light from said first light source such that light rays from said first light source enter said objective lens as converging rays, light from both light sources simultaneously focusing at the same position on said optical storage media.

17. A method of focusing light from first and second divergent light sources on an optical storage media, said first light source producing a first, longer wavelength than a second wavelength from said second source, comprising the step of collimating said first and second light sources in a collimation lens, said first light source placed at a distance from said collimation lens such that light of said first wavelength from said collimating lens is converging, light from both of said light sources simultaneously focusing at the same position on said optical storage media.

18. A method of focusing light from first and second divergent light sources on an optical data storage media, said first light source producing a first, shorter wavelength than a second wavelength from said second source, comprising the step of collimating light from said first and second light sources in a collimation lens, said first light source placed at a distance from said collimation lens such that light of said first wavelength from said collimation lens is diverging, light from both of said light sources simultaneously focusing at the same position on said optical data storage media.

* * * * *